(12) United States Patent
Wong

(10) Patent No.: US 6,312,754 B1
(45) Date of Patent: Nov. 6, 2001

(54) PEANUT BUTTER WITH IMPROVED FLAVOR AND TEXTURE

(75) Inventor: Vincent York-Leung Wong, Hamilton, OH (US)

(73) Assignee: The Procter & Gamble Co., Cincinnati, OH (US)

( * ) Notice: Subject to any disclaimer, the term of this patent is extended or adjusted under 35 U.S.C. 154(b) by 0 days.

(21) Appl. No.: 09/511,058

(22) Filed: Feb. 23, 2000

Related U.S. Application Data

(63) Continuation-in-part of application No. 08/935,456, filed on Sep. 24, 1997, which is a continuation of application No. 08/708,530, filed on Sep. 5, 1996, now Pat. No. 5,714,193.
(60) Provisional application No. 60/123,049, filed on Mar. 5, 1999.

(51) Int. Cl.$^7$ ........................................................... A23L 1/38
(52) U.S. Cl. ............................ 426/633; 426/466; 426/523
(58) Field of Search ..................................... 426/633, 466, 426/523

(56) References Cited

U.S. PATENT DOCUMENTS

| | | | |
|---|---|---|---|
| H1636 | 3/1997 | Sevenants et al. | 426/633 |
| 3,129,102 | 4/1964 | Sanders | 99/128 |
| 3,265,507 | 8/1966 | Japikse | 99/128 |
| 3,615,590 | 10/1971 | Avera et al. | 99/128 |
| 3,700,462 | * 10/1972 | Stefanucci et al. | 426/466 |
| 3,867,039 | * 2/1975 | Nelson | 235/195 |
| 4,341,814 | 7/1982 | McCoy | 426/607 |
| 4,466,987 | * 8/1984 | Wilkins et al. | 426/632 |
| 4,996,074 | 2/1991 | Seiden et al. | 426/601 |
| 5,041,541 | 8/1991 | Mazur | 536/11 |
| 5,079,027 | 1/1992 | Wong et al. | 426/633 |
| 5,230,919 | 7/1993 | Walling et al. | 426/633 |
| 5,306,518 | 4/1994 | Chablaix et al. | |
| 5,508,057 | 4/1996 | Wong et al. | 426/633 |
| 5,667,838 | 9/1997 | Wong et al. | 426/633 |
| 5,693,357 | 12/1997 | Wong et al. | 426/633 |
| 5,714,193 | 2/1998 | Fix et al. | 426/633 |
| 5,885,645 | 3/1999 | Wong et al. | 426/633 |
| 6,010,737 | * 1/2000 | Meade | 426/633 |

FOREIGN PATENT DOCUMENTS

| | | | |
|---|---|---|---|
| 2209592 | 7/1997 | (CA) | A23L/1/38 |
| 0 381 259 | 1/1990 | (EP) | |

\* cited by examiner

*Primary Examiner*—Helen Pratt
(74) *Attorney, Agent, or Firm*—Melody A. Jones

(57) ABSTRACT

This invention relates to improved nut spreads, especially peanut butters, comprising a darker roasted nut composition and a lighter roasted nut composition. The nut spreads have a relatively low viscosity yet provide an intense nut flavor. Disclosed are the product composition and the method for making the same.

35 Claims, 10 Drawing Sheets

Bi-modal particle size distribution of water insoluble solids in conventional peanut butter

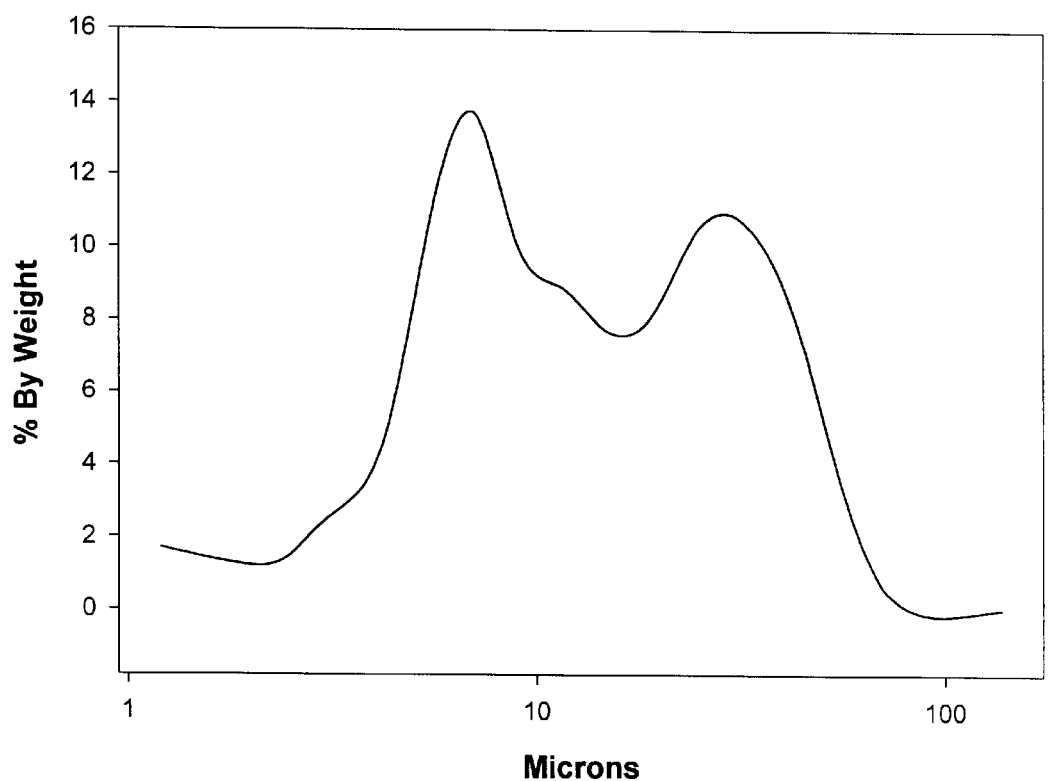
Figure 1 Bi-modal particle size distribution of water insoluble solids in conventional peanut butter

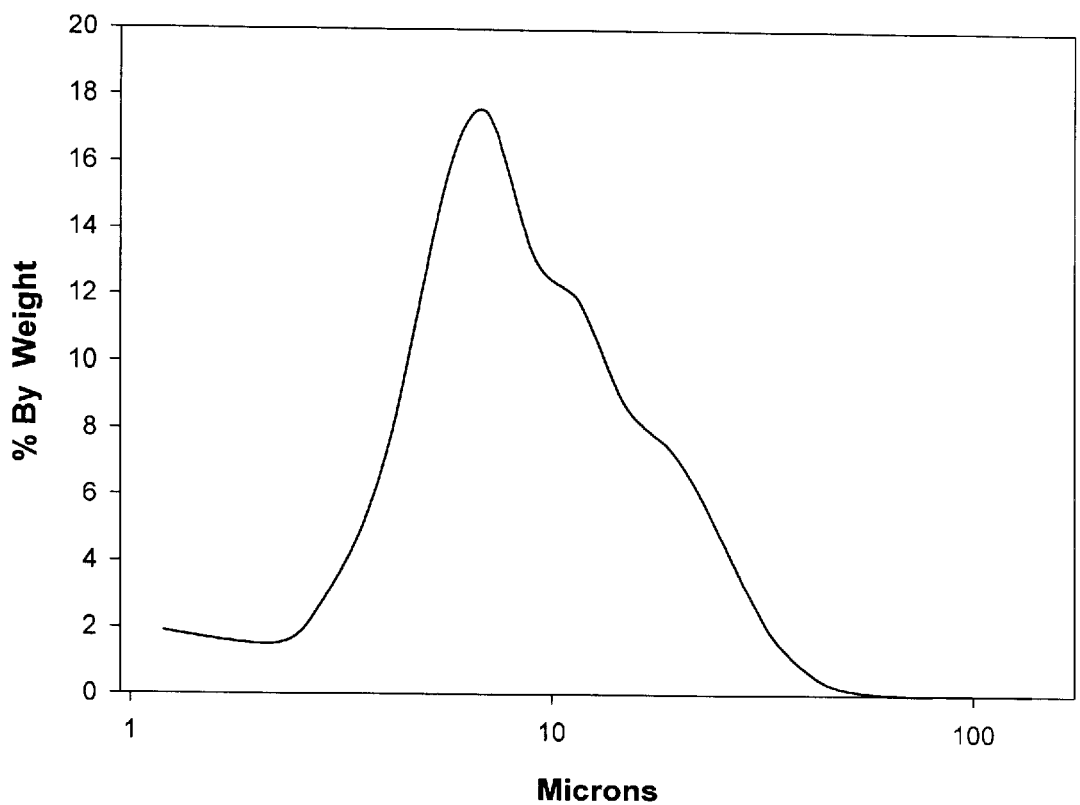
Figure 2 Mono-modal particle size distribution of water insoluble solids in high pressure homogenized base peanut butter

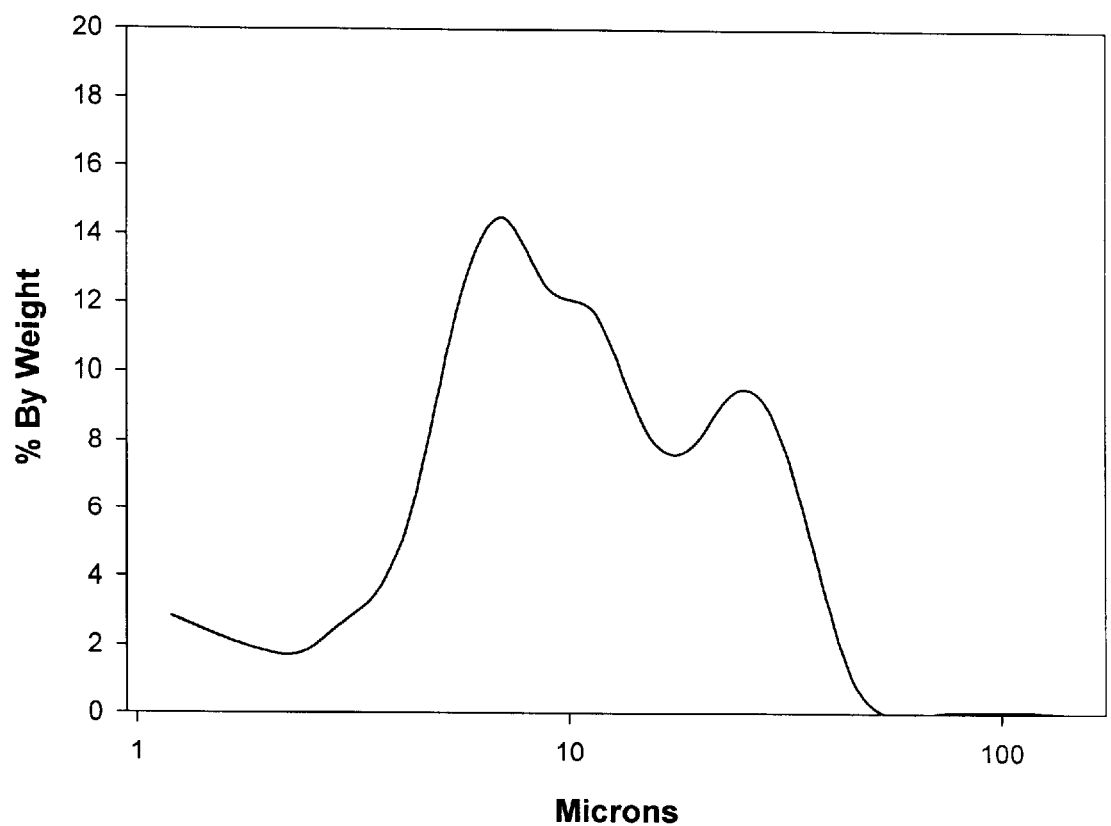
Figure 3a Particle size distribution of roll milled mix

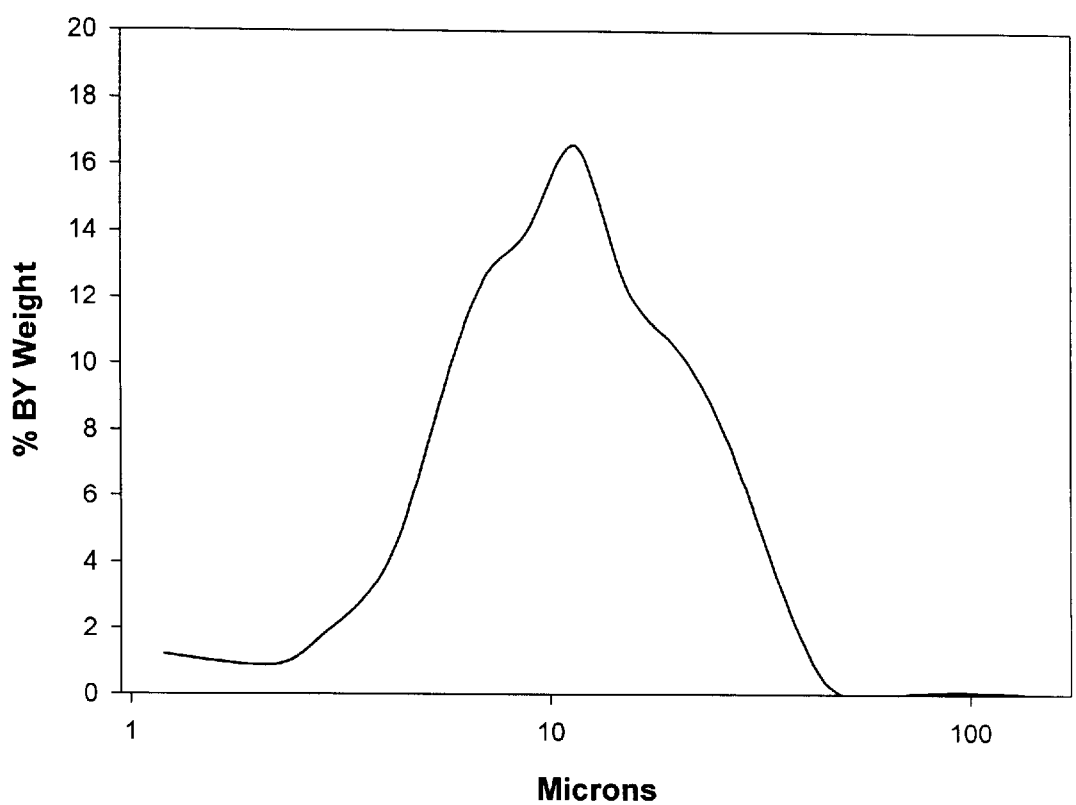
Figure 3b Particle size distribution of water insoluble solids in roll milled mix

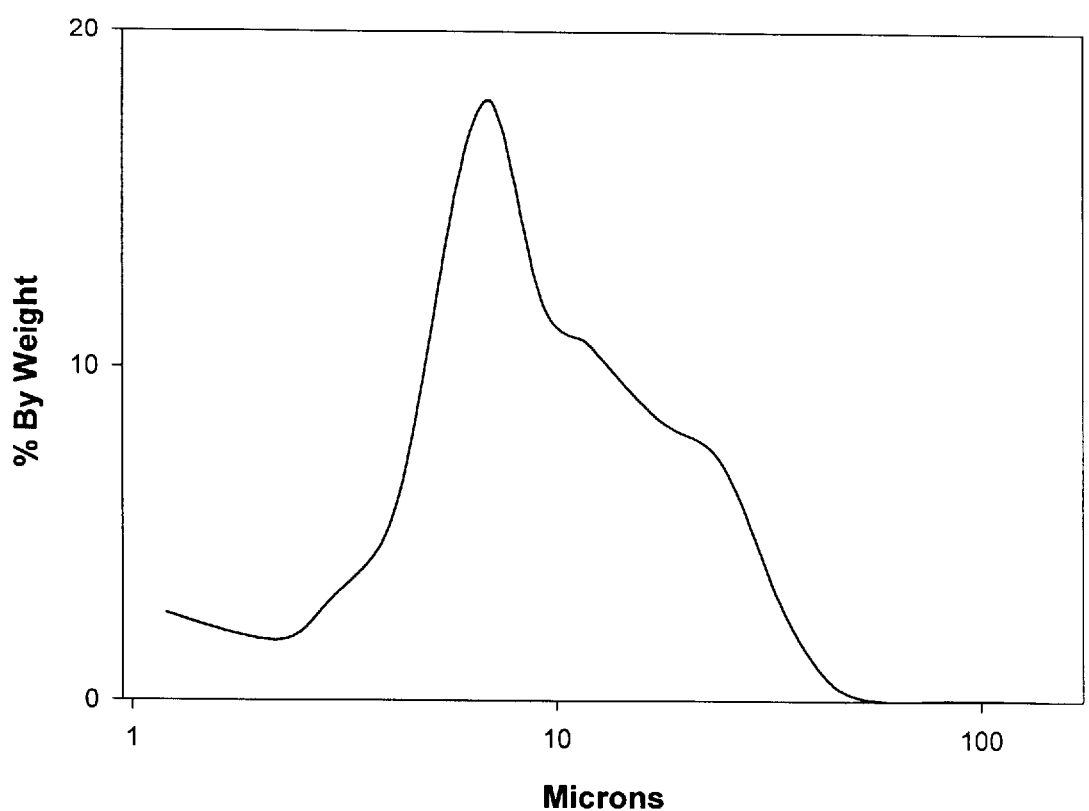
Figure 4a Mono-modal particle size distribution of product made according to the present inventioon

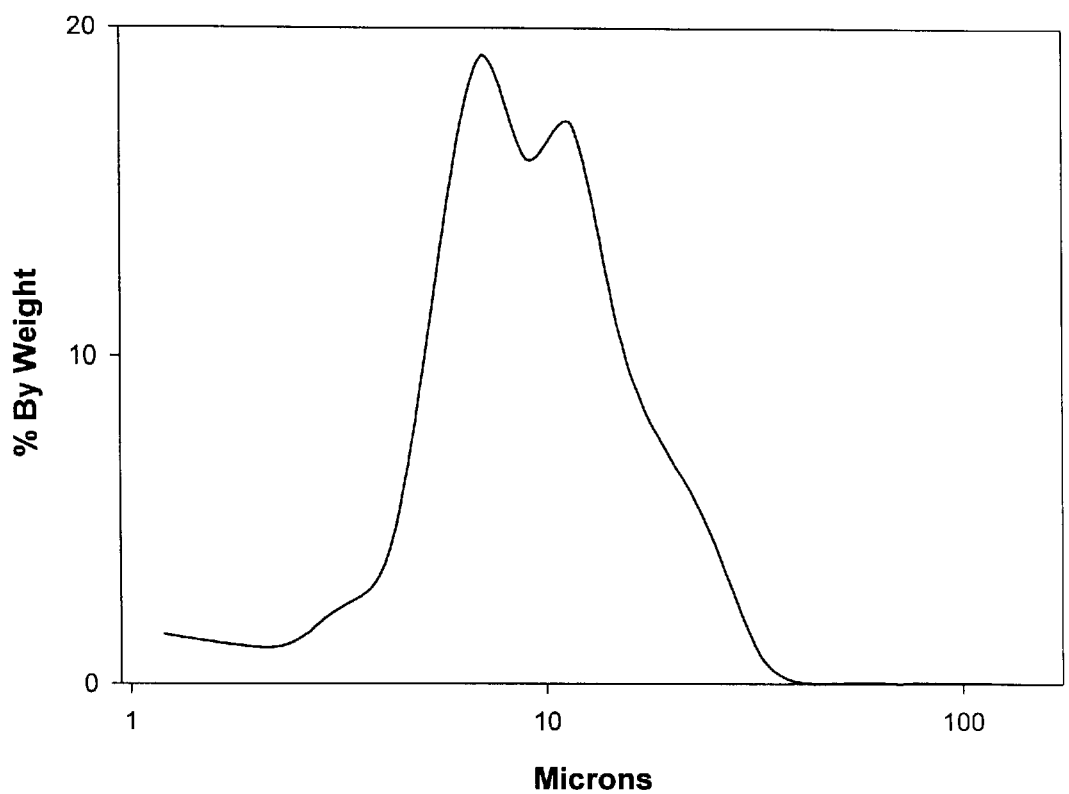
Figure 4b Mono-modal particle size distribution of water insoluble solids in product made according to the present invention

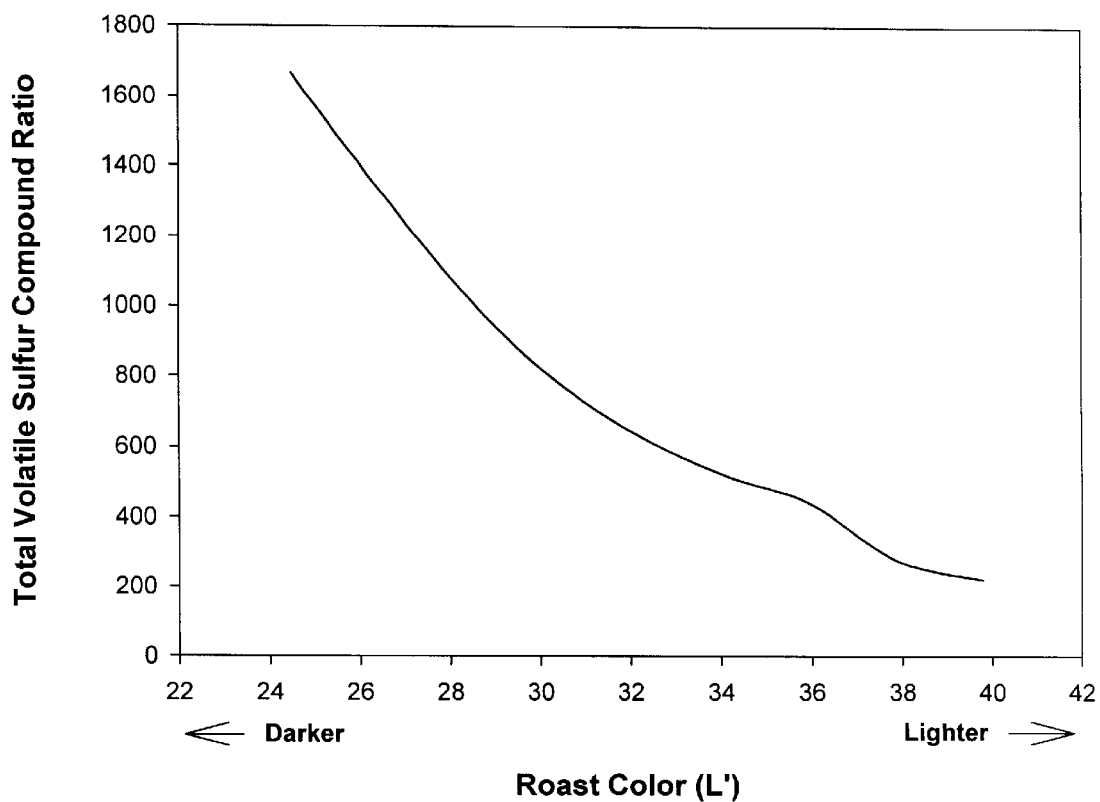
Figure 5 Roast Color Effect on Total Volatile Sulfur Compounds

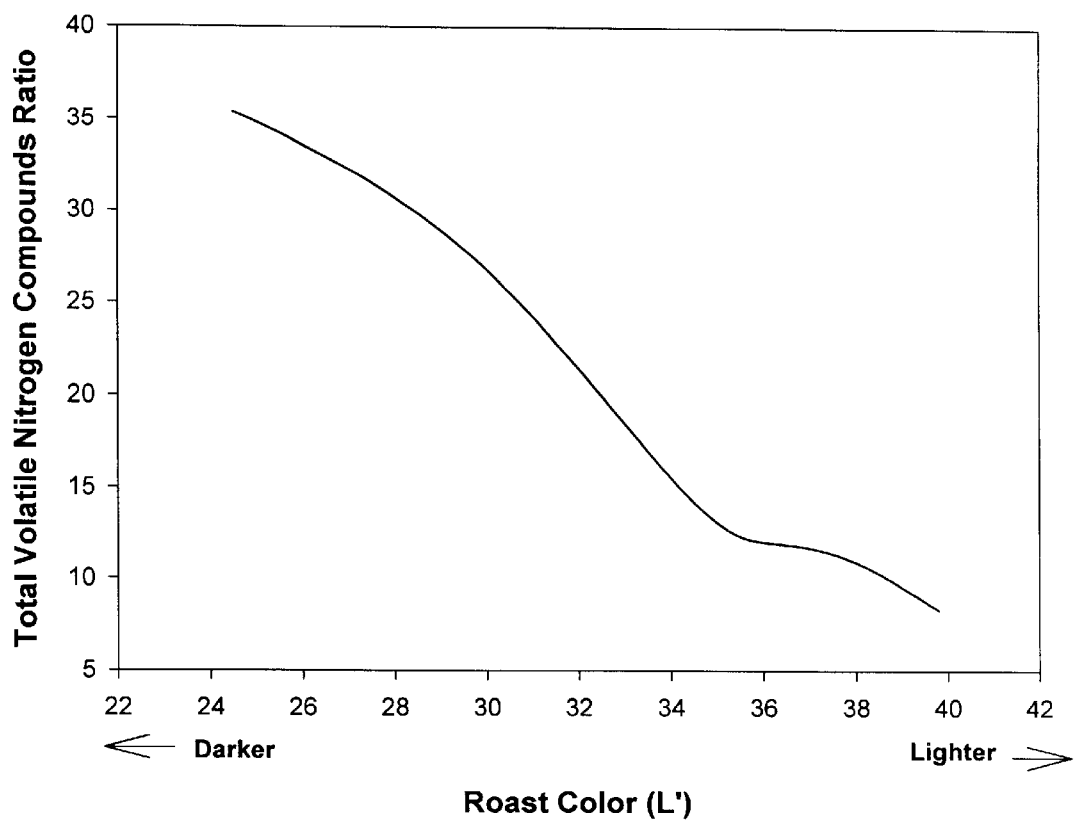
Figure 6 Roast Color Effect on Total Volatile Nitrogen Compounds

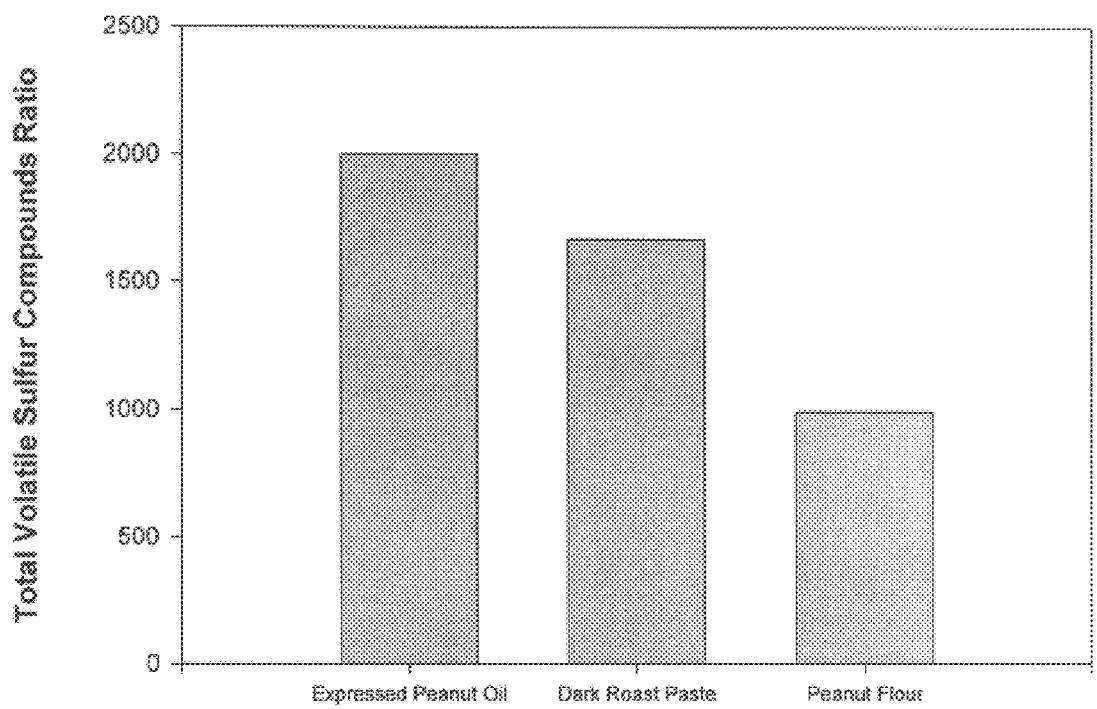

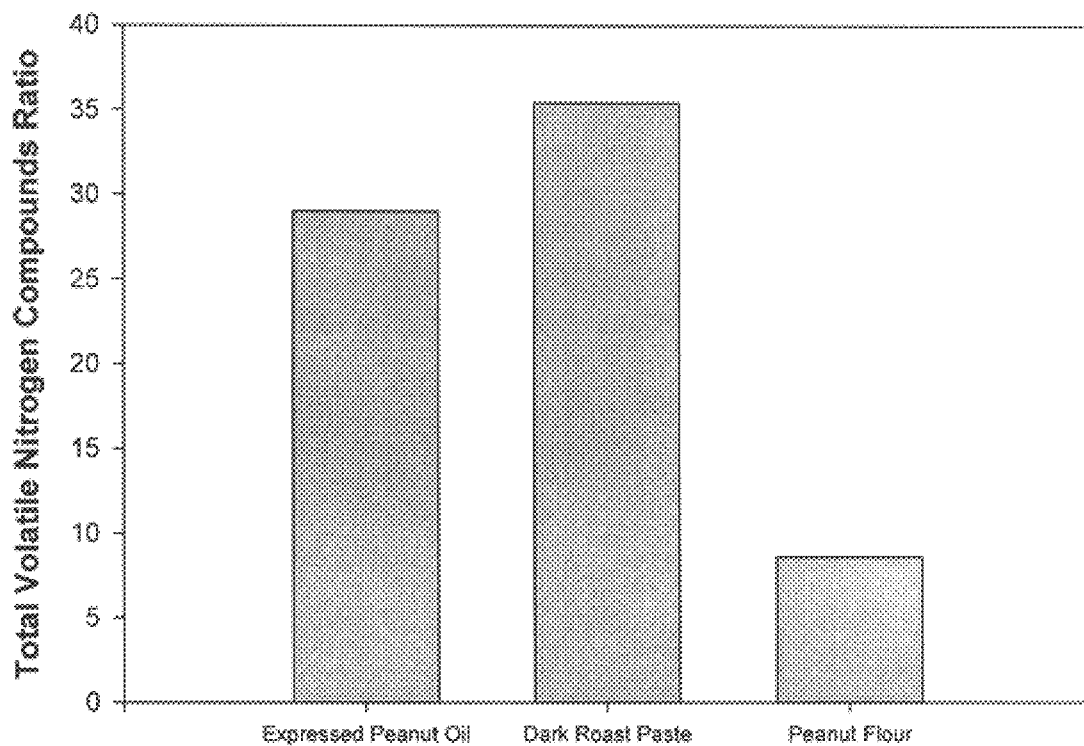
Figure 7b Total Volatile Nitrogen Compounds Ratio of Expressed Peanut Oil, Peanut Paste and Peanut Flour

PEANUT BUTTER WITH IMPROVED FLAVOR AND TEXTURE

CROSS REFERENCE TO RELATED APPLICATIONS

This application claims priority to U.S. Provisional Application Serial No. 60/123,049 filed Mar. 5, 1999, and is a Continuation-in-Part of U.S. application Ser. No. 08/935,456 filed Sep. 24, 1997, which is a Continuation of U.S. application Ser. No. 08/708,530 filed Sep. 5, 1996 (issued Feb. 3, 1998 as U.S. Pat. No. 5,714,193), all of which are herein incorporated by reference.

TECHNICAL FIELD

This invention relates to improved nut spreads, especially peanut butters having significantly more peanut flavor than conventionally processed peanut butters. The invention provides a peanut butter having both the desired nut flavor intensity and a reduced stickiness impression.

BACKGROUND OF THE INVENTION

Conventional peanut and other nut butters typically consist of a mixture of solid nut particles, liquid oil, and other optional ingredients including flavorants, an emulsifier and a stabilizer. The primary component of peanut butter, peanut paste, is generally prepared by roasting, blanching, then grinding shelled peanuts. The grinding operation breaks the cellular structure of the peanut kernels, liberating oil in which the comminuted nut particles are suspended to form a peanut paste having a pasty and spreadable consistency. The flavorants, emulsifier, stabilizer and other optional ingredients are then added to the peanut paste to provide a peanut butter having a desirable taste and consistency.

Consumers consider a number of factors when evaluating the desirability of peanut butter. One very important factor is "peanut flavor" perception. Although the flavor of the nut paste can be that of the natural (raw) nut, the desired flavor is more typically developed by subjecting the nuts to a thermal operation such as roasting. For example, peanuts can be roasted in a hot air convection roaster (e.g., a Jet Zone™ roaster manufactured by Wolverine). The roast temperature and the roast time control the nut flavor character and intensity.

Generally, roasting peanuts at a higher roast temperature and shorter time results in the most desirable peanut flavor. Roasting peanuts at higher temperatures creates a non-uniform temperature profile and, in turn, a non-uniform flavor profile within the peanut (darker roast outside and lighter roast inside). This non-uniformity produces a peanut flavor more desirable than that of peanuts roasted to the same color but at a lower roast temperature. However, there is a limit to the amount of peanut flavor that can be developed by this approach.

Because of the non-uniform roast profile within the peanut, roasting to a darker roast color to further intensify peanut flavor can cause over-roasting of the outer peanut, leading to undesirable burnt and bitter flavors. Past efforts to intensify peanut flavor by over-roasting required the use of high levels of sweeteners such as sucrose to diminish the negative over-roasted flavors. However, the level of sweetener required to mask the over-roasted flavors was so great that excessive sweetness resulted and/or the product fell outside the peanut butter standard of identity.

Another factor important to consumers is "stickiness" perception. The consumer perceives "stickiness" as the peanut butter's adhesion to the roof of the mouth, as well as the effort required for the tongue to remove it therefrom. Stickiness perception is related to the viscosity of the nut butter. U.S. Pat. No. 5,714,193, issued Feb. 3, 1998 to Fix et al. (Adding Oil To Nut Paste Prior to Homogenization To Reduce Viscosity and Stickiness Without Loss of Nut Flavor), herein incorporated by reference, teaches that stickiness perception can be reduced by decreasing the viscosity of the peanut butter.

The particle size distribution (PSD) of the nut solids affects the resulting peanut butter viscosity. Peanut butters made by finely milling the nut solids to a mono-modal particle size distribution have relatively low viscosities. See U.S. Pat. No. 5,079,027, issued Jan. 7, 1992 to Wong et al. (Roll-milling Nut Solids To A Mono-modal Particle Size Distribution), and U.S. Pat. No. 5,508,057, issued Apr. 16, 1996 to Wong et al. (Process Of Making Monomodal Nut Butters And Spreads), both herein incorporated by reference. Conversely, coarser grinding to a poly-modal (or multi-modal) particle size distribution produces a more viscous peanut butter. A poly-modal particle size distribution results in increased particle packing behavior and a greater tendency of the nut particles to collide with each other under stress. In addition, coarser grinding of the nuts ruptures fewer oil cells, resulting in less free oil in the nut solid suspension. These factors cause the resulting poly-modal peanut butters to be more viscous than, and therefore stickier than, mono-modal peanut butters.

Unfortunately, prior efforts to reduce peanut butter viscosity have also led to a significant reduction in peanut flavor intensity, creating an undesired trade-off between stickiness reduction and peanut flavor. For example, chunky type peanut butters made with larger, coarsely-ground peanut granules have more peanut flavor than creamy style peanut butters, but the processing conditions creating these larger particle size peanut solids generally lead to stickier peanut butters. Conversely, finely grinding the nut solids to reduce viscosity, and in turn reduce stickiness, decreases peanut flavor. It is believed that peanut flavor release is a function of the extent that the nut solids are hydrated. During the mastication process, a less sticky peanut butter product is in the mouth for a shorter period of time, thus reducing the degree of hydration of the nut solids and, in turn, leading to a decrease in peanut flavor.

Accordingly, consumers have experienced a long-felt need for a product providing more peanut flavor with a reduced stickiness impression.

SUMMARY OF THE INVENTION

The present invention relates to nut spreads, especially peanut butters, having intense nut flavor and reduced stickiness. The method of preparing the nut spread composition comprises the steps of:
  a. providing a lighter roasted nut composition;
  b. providing a darker roasted nut composition; and
  c. combining said lighter roasted nut composition with said darker roasted nut composition to provide said nut spread composition.

In one embodiment of the present invention, the roast color difference between the darker and the lighter roasted peanuts comprising the darker roasted and the lighter roasted nut compositions, respectively, is at least about 5 L' color units, and preferably about 10 L' color units or more. The lighter roasted nut composition comprises nuts that have been roasted to a color of less than about 39 L' color units, and more preferably from about 35 L' to about 38 L' color units. The darker roasted nut composition comprises nuts that have been roasted to a color of less than about 32 L' color units, and more preferably from about 24 L' to about 30 L' color units.

Applicants have discovered that combining a lighter roasted nut composition with a darker roasted nut composition simulates the flavor profile developed within a peanut that is roasted at high roast temperatures, resulting in a more intense and preferred nut flavor character. This flavor profile can be modified by varying the proportion of nuts roasted to different roast colors.

Applicants have also discovered how to reduce the undesirable over-roasted flavors associated with darker roasted peanuts. In a preferred embodiment, the darker roasted nut composition is defatted and processed to make a reduced fat peanut flour. Applicants have found that a significant reduction in the undesirable burnt/bitter flavor components produced by darker roasting is achieved by defatting the peanuts, since the oil phase contains a significant portion of the compounds responsible for the burnt/bitter flavors. Combining defatted peanut flour from darker roasted peanuts with a lighter roasted peanut butter base provides a peanut butter having the desired increase in peanut flavor but having only minimal burnt/bitter taste.

In a preferred embodiment, roll-refining a mix of defatted peanut flour and sugar to form a roll-refined mix provides an additional means of masking any remaining burnt/bitter flavors. Processing the sugar and defatted flour mix through a roll-refining mill transforms the sugar into its amorphous state. Sugar in its amorphous state has selective aromabinding properties that alter the flavor display of the roll-milled peanut solids. The result is a peanut butter with the intense flavor of darker roasted peanuts but without burnt/bitter notes.

A preferred embodiment of the present invention has significantly reduced stickiness. This is achieved by greatly reducing the viscosity of the nut spread, preferably to an apparent viscosity of about 1000 centipoise (cP) or less (measured at 150° F. at 6.8 sec$^{-1}$). Viscosity is reduced by adding "added oil" to the darker roasted nut composition, to the nut spread composition and/or by high shear mixing the nut spread composition until the desired viscosity is obtained. In addition, the nut solids can be finely milled to a mono-modal particle size distribution (PSD) to further reduce the viscosity of the nut spread. Unlike prior spreads, reducing the viscosity of Applicants' nut spread does not create an undesired trade-off between flavor and reduced stickiness. Due to Applicants' unique process for manipulating peanut flavor (increasing peanut flavor by overroasting a portion of the peanuts and decreasing over-roasted flavors by defatting and roll-milling), an intense nut flavor is maintained even at lower viscosities.

Additionally, applicants' invention may be used to produce nut spreads with bi-modal or multi-modal PSD nut solids. The spreads can be prepared as full-fat, reduced-fat and/or flavored nut spread variations.

DESCRIPTION OF THE DRAWINGS

FIG. 1 is a graphical representation showing the bi-modal particle size distribution curve of the water insoluble solids that are typical of conventional peanut butter.

FIG. 2 is a graphical representation showing the monomodal particle size distribution curve of the water insoluble solids that comprise the base butter according to one embodiment of the present invention.

FIG. 3a is a graphical representation showing the particle size distribution curve of a bi-modal composition of a roll-milled mix according to one embodiment of the present invention.

FIG. 3b is a graphical representation showing the particle size distribution curve of a mono-modal composition of the water insoluble solids that comprise a roll-milled mix according to one embodiment of the present invention.

FIG. 4a is a graphical representation showing the particle size distribution curve of a mono-modal composition of a nut spread according to one embodiment of the present invention, where a mono-modal base butter is combined with a roll-milled mix.

FIG. 4b is a graphical representation showing the particle size distribution curve of a mono-modal composition of the water insoluble solids that comprise a nut spread according to one embodiment of the present invention, where a monomodal base butter is combined with a roll-milled mix.

In FIGS. 1–4b above, the Y-axis is in units of weight percent and the X-axis (log scale) is in units of microns.

FIG. 5 is a graphical representation showing how roast color affects the level of total volatile sulfur compounds formed in peanuts. The X-axis is roast color and the Y-axis is total volatile sulfur compounds ratio (ratio of total volatile sulfur compounds GC peak area to internal standard GC peak area).

FIG. 6 is a graphical representation showing how roast color affects the level of total volatile nitrogen compounds formed in peanuts. The X-axis is roast color and the Y-axis is total volatile nitrogen compounds ratio (ratio of total volatile nitrogen compounds GC peak area to internal standard GC peak area).

FIG. 7a is a bar graph that illustrates the effect of defatting on the total volatile sulfur compounds ratio (ratio of total volatile sulfur compounds GC peak area to internal standard GC peak area). The graph shows the total volatile sulfur compounds ratio of the darker roasted paste, the peanut oil expelled from the darker roasted paste and the peanut flour.

FIG. 7b is a bar graph that illustrates the effect of defatting on the total volatile nitrogen compounds ratio (ratio of total volatile nitrogen compounds GC peak area to internal standard GC peak area). The graph shows the total volatile nitrogen compounds ratio of the darker roasted paste, the peanut oil expelled from the darker roasted paste and the peanut flour.

DETAILED DESCRIPTION OF THE INVENTION

A. Definitions

While this invention will be generally described in terms of peanuts and peanut butter, it should be readily apparent that other materials such as almonds, pecans, walnuts, cashews, filberts, macadamia nuts, Brazilians, sunflower seeds, sesame seeds, pumpkin seeds and soybeans could be utilized in this invention. The term "nut" as used herein encompasses these nuts and oil seeds. Mixtures of these nuts and oil seeds can also be used.

As used herein, "nut paste" means a suspension of nut solids and oil resulting from the milling of nuts, which milling ruptures the nut oil cells.

As used herein, the term "nut spread" means a spreadable food product made primarily from nut solids and fat/oil, plus other ingredients such as nut butter stabilizers, flavorants, flavor enhancers, bulking agents, emulsifiers, etc. Nut spreads include, but are not limited to, "nut butters" and "peanut butters" as these terms are defined by the standards of identity of the Food and Drug Administration.

As used herein, the term "total fat" refers to the total amount of fat and oil present in the nut spread. While the terms "fat" and "oil" are used somewhat interchangeably, the term "fat" usually refers to triglycerides (and their corresponding substitutes) that are solid or plastic at ambient temperature, while the term "oil" usually refers to triglycerides (and their corresponding substitutes) that are liquid or fluid at ambient temperature.

As used herein, the term "defatted" means that some oil or fat has been removed. "Defatted nut solids" means nut solids that have had some of their oil or fat removed.

As used herein, "peanut flour" is a flowable solid that is obtained after mechanically defatting peanut paste into a cake, followed by milling the cake into a granular powder.

As used herein, "nut solids" are the fat free peanut solids.

As used herein "mono-modal" refers to a particle size distribution of solids having essentially a single peak. A mono-modal particle size distribution is illustrated in FIG. 2. A "peak" is a local maxima which is at least 2 weight percent units greater than the local minima on either side of the local maxima. As used herein, "multi-modal" or "poly-modal" refers to a particle size distribution curve having multiple peaks. A bi-modal distribution is illustrated in FIG. 1 and shows two peaks.

As used herein, "GC" refers to Gas Chromatography.

As used herein, "total volatile sulfur compounds ratio" refers to a peanut sample's ratio of total volatile sulfur compounds GC peak area to internal standard GC peak area, as analyzed by capillary gas chromatography using a sulfur chemiluminescence detector (as set forth below in "Analytical Test Methods").

As used herein, "total volatile nitrogen compounds ratio" refers to a peanut sample's ratio of total volatile nitrogen compounds GC peak area to internal standard GC peak area, as analyzed by capillary gas chromatography using a nitrogen phosphorus detector (as set forth below in "Analytical Test Methods").

As used herein, "lighter roasted nut composition" means a nut composition comprising nuts of a lighter roast color than those comprising the darker roasted nut composition.

As used herein, "darker roasted nut composition" means a nut composition comprising nuts of a darker roast color than those comprising the lighter roasted nut composition.

As used herein, "$D_{90}$" is the diameter of the ninetieth (90th) percentile particles, i.e. 90% of the particles in a sample have a smaller particle size than the size indicated. "$D_{50}$" is defined in a similar manner and represents the fiftieth (50th) percentile particles.

As used herein, "added oil" means additional oil over and above that which is normally expressed from the nut during paste formation. Thus, the "added oil" does not include oil that is used to replace the burnt/bitter flavored oil that is removed from the darker roasted peanuts.

As used herein, all percentages (%) are by weight, unless otherwise indicated.

B. Lighter Roasted Nut Composition

Preferably, the lighter roasted nut composition comprises nuts that have been roasted to a color of less than about 39 L' color units, and more preferably from about 35 L' to about 38 L' color units. These lighter roasted peanuts typically comprise from about 50% to about 95%, and more typically from about 75% to about 90%, of the nut solids present in the nut spread. The flavor profile of the finished spread can be modified by varying the proportion of nuts roasted to different roast colors.

Base Butter

In a preferred embodiment, the lighter roasted nut composition is prepared in the form of a "base butter." To prepare the base butter, peanuts are roasted to the desired roast color, then blanched. The clean nuts are then ground to a paste, such as by processing through a Bauer mill. Next, the paste is mixed with added oil, sugar, salt, molasses, fat stabilizer or any other desired optional ingredients. After mixing, the nut paste mixture is processed through a high pressure homogenizer to convert the mixture into a mono-modal particle size distribution. A process for making mono-modal nut butters and spreads is described in U.S. Pat. No. 5,508,057, issued Apr. 16, 1996 to Wong et al. (Process of Making Mono-modal Nut Butters and Spreads), which is herein incorporated by reference. After high pressure homogenization, the particle size distribution of the water insoluble solids is mono-modal and typically has the particle size distribution illustrated in FIG. 2. Conventionally processed nut butters have a bi-modal particle size distribution, as illustrated in FIG. 1. Alternatively, it should be recognized that the mixture can be processed to have a multi-modal PSD if a less creamy or a stickier product is desired. The resulting mixture is a base butter that can be used in preparing the finished nut spread.

C. Darker Roasted Nut Composition

Typically, the roast color difference between the darker and the lighter roasted peanuts comprising the darker roasted and the lighter roasted nut compositions, respectively, is at least about 5 L' color units, and preferably about 10 L' color units or more. Preferably, the darker roasted nut composition comprises nuts that have been roasted to a color of less than about 32 L' color units, and more preferably from about 24 L' to about 30 L' color units. These darker roasted peanuts typically comprise from about 5% to about 50%, and preferably from about 10% to about 25%, of the total nut solids in the finished nut spread. The flavor profile of the finished spread can be modified by varying the proportion of nuts roasted to different roast colors.

However, roasting to a darker roast color to further intensify peanut flavor can cause over-roasting of the outer peanut, leading to undesirable burnt and bitter flavors. This effect is illustrated by FIGS. 5 and 6, which show that very high levels of volatile sulfur and volatile nitrogen compounds substantially develop when peanuts are roasted to a color of less than about 34 L' color units. Excess development of volatile sulfur and volatile nitrogen compounds is an indication that undesirable over-roasted flavors are being generated. Applicants have found that a significant reduction in the undesirable burnt/bitter flavor components produced by darker roasting is achieved by defatting the peanuts. FIGS. 7a and 7b illustrate the significantly lower levels of total volatile sulfur and total volatile nitrogen compounds, respectively, in the defatted peanut flour of the present invention as compared to the original dark roast peanut paste.

Roll-milled Mix

In a preferred embodiment, the darker roasted nut composition is prepared in the form of a roll-milled mix. To prepare the roll-milled mix, peanuts are roasted to the desired roast color, blanched and then milled to form a fluid paste. Next, the peanut paste is mechanically defatted to from about 10% to about 42%, preferably from about 15% to about 33%, and more preferably from about 20% to about 30% total fat, by weight. Any press, expeller or similar device used to deoil or defat solids can be used. For example, a hydraulic press similar to that used to remove cocoa butter from cocoa solids can be used. A nut cake or paste results from the defatting process. Preferably, the nut cake is made into a peanut flour by using conventional milling or de-lumping equipment. The peanut flour has a total volatile sulfur compounds ratio of less than about 1500, and a total volatile nitrogen compounds ratio of less than about 10.

Next, the peanut flour is mixed with sugar and roll-refined. Preferably, the ratio of peanut flour to sugar is determined by the fat content of the mix. For efficient roll-refining, the mix should have a fat content of from about 20% to about 30%. Thus, for a peanut flour with from about 28% to about 30% fat, the ratio of peanut flour to sugar is about 3:1. Roll-refining the peanut flour with sugar, according to the present invention, significantly reduces the over-roasted flavors in the peanut flour. Mechanistically, roll-refining the mix results in the sugar becoming amorphous. Amorphous sugar is known to selectively bind and entrap flavors. This mechanism is reported to occur in chocolate refining processes and is detailed in the following publications, which are herein incorporated by reference: E. A. Niedek, Amorphous Sugar, Its Formation and Effect On Chocolate Quality, MANUFACTURING CONFECTIONER, 71(6): 91–9 (1991); and E. A. Niedek, Investigation Into The Influence of Flavor Adsorption Of Sugars On The Flavor Quality Of Different Chocolates, REVIEW FOR CHOCOLATE, CONFECTIONERY AND BAKERY, 7(1):3–4, 6–10 (1982).

The resultant mix has a bi-modal particle size distribution, as illustrated in FIG. 3a. It has a $D_{50}$ and a $D_{90}$ that are 9.3 and 26.7 microns, respectively. The particle size distribution of the water insoluble solids comprising the roll-milled mix is mono-modal, as illustrated by FIG. 3b. These water insoluble solids have a $D_{50}$ and a $D_{90}$ that are 10.7 and 24.0 microns, respectively. It should be noted that the fineness of the particle size reduction is controlled by the composition (% fat, % sugar) of the roll-milled mix. Roll-milling the water insoluble solids to a mono-modal particle size distribution is preferred, since this reduces the amount of processing needed to convert the roll-milled mix to a fluid paste by adding peanut oil. For reference, see U.S. Pat. No. 5,079,027, issued Jan. 7, 1992 to Wong et al. (Nut Butter and Nut Solid Milling Process). Once the product is roll-milled, it is then combined with the lighter roasted base butter. Alternatively, the roll-milled mix can be converted into a fluid paste by adding oil prior to combination with the base butter. This allows for easy mixing with the base butter to make the finished product.

It should also be noted that a mixture of the lighter roasted and darker roasted paste can be used to make the roll-milled mix. This mixture can be prepared before the defatting step by blending the two paste streams, or in the roll-refining step by adding the lighter roasted paste to the darker roasted peanut flour.

D. Fats and Oils

The nut spreads of the present invention contain "added oil." The added oil is used to further reduce the viscosity of the nut spread, which in turn reduces stickiness perception and enhances peanut flavor display. U.S. Pat. No. 5,714,193, issued Feb. 3, 1998 to Fix et al. (Adding Oil To Nut Paste Prior to Homogenization To Reduce Viscosity and Stickiness Without Loss of Nut Flavor), herein incorporated by reference, teaches that stickiness perception can be reduced without loss of peanut flavor by adding peanut oil to help make low viscosity peanut butters or spreads. Typically, the amount of added oil is greater than about 3%, and preferably from about 3% to about 6.5%.

The added oil used in the nut spreads is typically of the same type naturally expressed from the nut or seed, such as during the formation of a nut paste. In the present invention, the added oil is preferably peanut oil. However, oils such as soybean oil, palm oil, cottonseed oil, coconut oil, walnut oil, sunflower seed oil and other suitable edible oils or mixtures thereof can also be used.

Low calorie and zero calorie oil substitutes, such as sucrose polyesters of long chain fatty acids (Olestra) and other polyol polyesters of fatty acids, can be used as the added oil in making these nut spreads. See, for example, U.S. Pat. No. 3,600,186, issued Aug. 17, 1971 to Mattson et al.; U.S. Pat. No. 5,422,131, issued Jun. 6, 1995 to Elsen, et al.; U.S. Pat. No. 5,419,925, issued May 30, 1995 to Seiden et al.; and U.S. Pat. No. 5,071,669, issued Dec. 10, 1991 to Seiden, all of which are herein incorporated by reference. Mixed triglycerides made from medium and long chain saturated and/or unsaturated fatty acids can also be used as the added oil herein. See, for example, U.S. Pat. No. 5,288,512, issued Feb. 22, 1994 to Seiden, which is herein incorporated by reference. Oils that contain medium chain triglycerides can also be used as the added oil source. See U.S. Pat. No. 4,863,753, issued Sep. 5, 1989 to Hunter et al., which is herein incorporated by reference.

E. Water-Soluble Solids

The nut spreads of the present invention can also comprise from about 5% to about 50%, preferably from about 10% to about 25%, water-soluble solid components. These water-soluble solids can include flavorants, flavor enhancers, and bulking agents, as well as mixtures thereof.

As used herein, the term "flavorant" refers to agents that contribute to the flavor of the nut spread. These include sweeteners, natural and artificial flavors, and other agents, including natural or artificial peanut flavors, roasted flavors, praline/caramel flavors, walnut flavors, almond flavors and flavor compositions. Sweeteners can be selected from sugars, sugar mixtures, artificial sweeteners and other naturally sweet materials. Sugars include, for example, sucrose, fructose, dextrose, honey, high fructose corn syrup, lactose, maltose, and maltose syrups. Preferably, the sweetener will have a sweetness intensity the same or similar to that of sucrose or fructose. Sugars are typically included in the nut butters of the present invention at a level of from about 0.5% to about 10%, preferably from about 1% to about 7%.

Artificial sweeteners such as aspartame, acesulfam, saccharine, cyclamate and glycerrhizin can also be used in the nut spreads of the present invention. The amount of artificial sweetener used depends on its sweetness intensity. Typically, these artificial sweeteners are included at a level that provides a sweetness intensity equivalent to the addition of from about 0.5% to about 10%, preferably from about 1% to about 7%, sucrose. Usually from about 0.001% to about 2% artificial sweetener is used.

As used herein, "flavor enhancers" refer to agents that enhance or complement the flavor of the nut spread. Flavor enhancers include salt or salt substitutes such as sodium chloride, potassium chloride, sodium chloride/potassium chloride mixtures and seasoned salts. The level of flavor enhancer used is a matter of the desired taste level, but usually is from about 0.1% to about 2%, preferably from about 0.5% to about 1.5%, of the nut spread.

The nut spreads of the present invention can also comprise from about 0.01% to about 0.02% citric acid as a flavor enhancer. Preferably from about 0.01% to 0.015% citric acid is used. The addition of citric acid enhances the roasted nut flavor and the saltiness impression, thereby reducing the amount of salt required to give the nuts spreads of the present invention, especially peanut butters, an acceptable flavor. The addition of citric acid, especially in the presence of a metallic ion salt, also allows the nut spread to achieve oxidative stability through chelation of the metal ions by the citric acid.

Particularly preferred flavor systems for use in the nut spreads of the present invention are those involving a combination of sugar and salt. For nut spreads using this preferred flavor system, the sugar is typically present in the spread at a level from about 0.5% to about 10%, preferably from about 1% to about 7%. The level of salt is typically present in the spread at a level of from about 0.1% to about 2%, preferably from about 0.8% to about 1.5%.

Water soluble bulking agents can also be used in the nut spreads of the present invention. These bulking agents typically add body or texture to the spread and can be non-nutritive or low calorie materials. Suitable bulking agents include corn syrup solids, maltodextrin, dextrose, polydextrose, mono- and disaccharides, starches (e.g., corn, potato, tapioca, wheat), as well as mixtures of these agents. Corn syrup solids, polydextrose (from Pfizer Chemicals) and maltodextrin are preferred bulking agents. Sugar substitutes which function like sugars but which are non-nutritive can also be used herein. Such sugar substitutes include the 5-C-hydroxyalkylaldohexoses described in U.S. Pat. No. 5,041,541, issued Aug. 20, 1991 to Mazur.

In order to minimize grittiness, these water-soluble solids preferably have a relatively fine particle size. Water soluble solids included in the nut spreads of the present invention typically have a mean particle size of about 25 microns or less. Especially preferred water soluble solids have a mean particle size of about 20 microns or less.

F. Other Solids

Nut spreads of the present invention can comprise solids other than nut solids and water soluble solids. These other solids can be present in the nut spreads of the present invention in combined amounts of up to about 20%, preferably up to about 10%. These other solids can include fibers (e.g., cellulose), flours (e.g., wheat, rye, pea) and protein supplements (e.g., additional peanut solids, soy flour, soy concentrate, soy isolate, casein, egg whites, protein from other animal or vegetable sources), or any combination thereof.

G. Nut Butter Stabilizers and Emulsifiers

The nut spreads of the present invention can also optionally, but preferably, comprise a nut butter stabilizer in effective amounts of up to about 5%. Preferably from about 1% to about 3% nut butter stabilizer is used. These nut butter stabilizers can be any of the known peanut butter stabilizers, for example, hydrogenated rapeseed oil or other hydrogenated triglycerides having a high proportion of $C_{20}$ and $C_{22}$ fatty acids. For example, see U.S. Pat. No. 3,265,507, issued Aug. 9, 1966 to Japikse, and U.S. Pat. No. 3,129,102, issued Apr. 14, 1964 to Sanders, which are herein incorporated by reference.

These stabilizers are usually triglycerides which are solid at room temperature. They solidify in the nut spread in specific crystalline states and keep the oil from separating. These materials can be mixed with a second hydrogenated oil having an iodine value of less than 8, for example hydrogenated palm oil, canola oil, soybean oil, rapeseed oil, cottonseed oil, coconut oil and similar materials. This stabilizer can also be mixed with lower melting fat fractions as, for example, the peanut butter stabilizer composition disclosed in U.S. Pat. No. 4,341,814, issued Jul. 27, 1982 to McCoy, which is herein incorporated by reference. Other suitable nut butter stabilizers for nut spreads of the present invention include tailored β' stable hardstocks, referred to as "PSP/PSS" hardstocks, as disclosed in U.S. Pat. No. 4,996,074, issued Feb. 26, 1991 to Seiden et al., which is herein incorporated by reference.

Emulsifier can also be used in the nut spreads of the present invention to achieve the proper texture. The emulsifier can be any food compatible emulsifier such as mono- and diglycerides, lecithin, sucrose monoester, polyglycerol esters, sorbitan esters, polyethoxylated glycols and mixtures thereof. Up to about 5%, preferably from about 0.1% to about 3%, emulsifier is used.

H. Other Optional Components

Nut chunks (including defatted nut chunks), flavored or candied bits and other optional components can be included at various levels in the nut spreads of the present invention. These other components include chocolate chips or bits or other flavored bits (e.g., butterscotch, peanuts), jellies (either low calorie jelly, regular jelly or preserves), praline nuts or other candies. These other components are usually included at levels up to about 20% of the nut spread.

I. Preparation of Nut Spreads from a Lighter Roasted Nut Composition and a Darker Roasted Nut Composition The finished nut spread is made by mixing the lighter roasted nut composition with the darker roasted nut composition, along with added oil and any other desired components. In a preferred embodiment, the lighter roasted nut composition is in the form of a base butter, and the darker roasted nut composition is in the form of a roll-milled mix or in the form of a paste prepared by refatting the roll-milled mix with peanut oil. The nut solids of the darker roasted peanuts comprise from about 5% to about 50%, preferably from about 10% to about 25%, of the total nut solids in the nut spread.

The base butter and the roll-milled mix are mixed together, along with added oil and any other desired components. To reduce viscosity, the mixture can be re-circulated through a homogenizer and/or a colloid mill. The low viscosity nut spread is then processed through any appropriate conventional peanut butter finishing process in order to increase its oxidative stability and to set up its crystalline structure.

The preferred nut spread of the present invention has an apparent viscosity of less than about 1000 cP. The particle size distribution of the finished product and the particle size distribution of the water insoluble solids in the finished product have mono-modal particle size distributions. See FIGS. 4a and 4b. For a peanut butter product where peanuts comprise at least about 90% of the formulation, the particle size distribution of the water insoluble solids is about the same as that of the finished product. The $D_{50}$ is about 10 microns or less, and the $D_{90}$ is about 30 microns or less. For a reduced fat peanut spread, or for a flavored peanut spread, the particle size distributions of the finished product and its water insoluble solids can differ due to the admix of water soluble solids. In these products, the water insoluble solids are typically finer than the finished product and typically have the distribution illustrated in FIG. 2.

ANALYTICAL TEST METHODS

1. Viscosity and Yield Value of Nut Pastes and Nut Spreads

A Brookfield Viscometer (HAT series), 5C4-13R chamber with a 8C4-27 spindle is used. This arrangement consists of a spindle "bob" of 0.465 inches (1.12 cm). The inner diameter of the sample cell is 0.750 inches (1.87 cm). The instrument is calibrated at 65° C. (149° F.) and all samples are measured at 65° C. (149° F.).

A sample of 14.0 g of the nut spread or nut paste (unaerated) is placed in the sample cell. The sample cell is then inserted into the jacketed cell holder. To compensate for heat losses through the tubings, etc., the water temperature entering the jacketed cell holder should be a few degrees higher than the desired sample temperature of 65° C. (149° F.). After the temperature of the sample has reached 65° C. (149° F.), the sample is pre-sheared for five minutes at 50 rpm. The speed is then changed to 100 rpm and a measurement taken after the dial reading settles to a constant value. Scale readings are recorded at 100, 50, 20, 10 and 5 rpm, for a total of five scale readings. In general, the time before reading should be as set forth in Table I.

TABLE 1

| RPM | Time Before Reading (Seconds) |
| --- | --- |
| 100 | 3 |
| 50 | 6 |
| 20 | 15 |
| 10 | 30 |
| 5 | 60 |

The dial reading and rpm are converted into shear stress and shear rate values by multiplying the dial reading and the rpm by 17 and 0.34, respectively. A plot of the square root of shear stress vs. the square root of shear rate results in a straight line. Readings where the dial pointer goes off-scale are ignored. A least squares linear regression is made over the data to calculate the slope and intercept.

This data is used to calculate two values. The first of these is the Casson plastic viscosity, which is equal to the slope of the line squared. The Casson plastic viscosity is a measurement of the viscosity of the nut spread or nut paste at an infinite shear rate. It accurately predicts the resistance to flow in pumping, moving or mixing situations. The Casson plastic viscosity is measured in poise.

The second value is the yield value, which is equal to the value of the y-intercept (ordinate) squared. The yield value is a measure of the amount of force or shear that is necessary to get the nut spread or nut paste to start moving. The yield value is measured in dynes/cm$^2$. The relationship between the plastic viscosity and the yield value determines how a nut spread or nut paste will behave in additional processing.

The apparent viscosity is the viscosity measured at 6.8 sec$^{-1}$ (Brookfield setting at 20 rpm). The apparent viscosity, reported in centipoise (cP), is:

250× (the Brookfield Viscometer dial reading at 20 rpm)

Without being limited by theory, it is believed that the viscosity measured at 6.8 sec$^{-1}$ has the best correlation with sensory attributes.

2. Particle Size Distribution of Water Insoluble Solids in Nut Pastes and Nut Spreads A. Sample preparation Apparatus:

1. Vortex Jr.—Model —K-500 5 Scientific Industries—Bohemia, N.Y. 11716
2. Bandelin Sonorex—Model—RX 106 (Ultrasonic Bath) Bandelin Corp.—Berlin, West Germany
3. IEC Clinical Centrifuge—Model—AF 1752 Damon/IEC Corp.—Median Hts., Mass. 02194
4. Test Tubes with lids—Model—14956-IJ Fisher Scientific—Pittsburgh, Pa. 15218
5. Acetone—Omni/Solv HR EM-AX0110-1 VWR Scientific—Chicago, Ill. 60666
6. Disposable Glass Pipettes—#13-678-20A (5¾" length) VWR Scientific—Chicago, Ill. 60666
7. Malvern 2600D Laser Particle Size Analyzer with IBM PS2 Computer; Munhall Company—Worthington, Ohio 43085

Sample Preparation Method:

1. Weigh 0.2–0.3 g (±0.05 g) of sample into test tube.
2. Add 5.0 g (±0.1 g) of acetone to test tube containing sample.
3. Mix test tube on the Vortex Shaker for 10 seconds.
4. Place test tube in centrifuge for 10 minutes on the highest speed.
5. Decant liquid, then repeat steps #2 through #4 two times.
6. After last acetone extraction, add 6.0 g (±0.1 g) of distilled water to sample in test tube.
7. Mix on Vortex Shaker for 20 seconds.
8. Place test tube in centrifuge for 10 minutes on the highest speed.
9. Decant liquid, then repeat steps #6 through #8 two times.

NOTE:

When using this method on crunchy nut spreads, the above water extraction is performed four times instead of three times, and the samples are placed on the Vortex Shaker for 30 seconds instead of 20 seconds.

10. Place 0.50 g of extracted sample in test tube with 5.0 g (±0.1 g) of acetone.
11. Mix sample on Vortex Shaker for 20 seconds.
12. Place test tube in Ultrasonic Bath for at least 3 minutes.

B. Particle Size Analysis

A Malvern 2600D particle size analyzer with an IBM PS/2 computer is used to analyze the particle size of the samples. A small amount (about 0.01 g) of the sample after completion of Step 12, above, is placed in a 25 ml test tube and about 15 ml of acetone are added to it. The sample is dispersed in the acetone by using a Vortex mixer. A transfer pipette is then used to add this diluted solution dropwise to the acetone filled cell of the analyzer. The sample is added until the obscuration is from about 0.2 to about 0.3 (20% to 30% of the light energy is reduced). The obscuration refers to the amount of light which is obscured by the sample because of diffraction and absorption. The instrument reads more accurately when the obscuration is from about 0.05 to about 0.5, and preferably from 0.2 to 0.3.

The apparatus is fitted with a 100 mm lens to determine the particle size of the paste or spread. Particle sizes from 0.5 to 188 microns can be measured using a 100 mm lens. A magnetic stirrer is used to insure that the sample is being dispersed during the readings. Each sample is swept 250 times by the laser for each reading. Each sample is read a minimum of three times with a five (5) minute wait between each reading.

3. Peanut Roast Color Measurement

This method is used for measuring the color of roasted peanuts. The color of peanut paste or peanut butter is established primarily by the degree to which peanuts are roasted. Color measurements are expressed in terms of "L" (lightness) and in terms of "a" (redness or greenness). Increases in degree of roast color decrease "L" and increase "a". A change in the degree of roast color influences "L" more strongly than "a", and a change in nut variety will influence "a" more strongly. Thus, to improve color control, the "L" and "a" values are converted to "L prime" (L') values.

The sample is prepared by grinding 300–400 g of roasted, blanched peanuts into a homogenous paste by using a laboratory mill. The paste is then placed into a peanut butter lid (outside diameter 3⅜ inches ×depth ⅞ inch ×inside diameter 3⅛ inches), over-filling it. The paste is spread with a spatula to form a slightly convex surface and to cover the edges of the lid.

For analysis of roast color, a Hunter Color Difference Meter, Model D2SA-9 (available from Hunter Associates Laboratory, Inc.) is used. The meter is calibrated and the color of the sample is read according to the following instructions:

1. Turn on the meter and allow the meter to warm up for 45 minutes.
2. Place the black standard tile, shiney side up, onto the sample port. Make sure the tile is clean. Center the black standard tile on the port. Zero the meter. Remove the black tile from the sample port.
3. Place the calibrated white standard tile onto the sample port. Make sure the tile is clean. Center the calibrated white standard tile on the port. Standardize the meter such that the meter's readings for the X, Y, and Z values match the calibrated X, Y, and Z values for the tile. Remove the white tile from the sample port.
4. Place onto the sample port the brown peanut butter standard tile with a clear glass tile on top of the brown tile. Make sure that both tiles are clean. Center the tiles on the port. Standardize the meter such that the meter's readings for the X, Y, and Z values match the calibrated X, Y, and Z values for the brown tile. Remove the tiles from the sample port. The meter is now ready to measure peanut paste or butter colors.
5. Center the clear glass tile over the sample and press down on the sample with a gentle rocking motion until the tile rests on the lid edges. Make sure that no air pockets exist between the clear glass tile and the peanut paste or butter (the surface of the peanut paste or butter should be completely smoothed out by the glass tile). The same glass tile used to calibrate the instrument in Step 4 should also be used for analyzing the sample, otherwise erroneous results may be obtained. Place the glass tile and sample onto the specimen port. Make sure the sample completely covers the specimen port. Read the "L" and "a" color values for the sample. Convert these values into the "L'" value, using the following formula:

$$L' = 0.829L - 0.3966a + 1.4935.$$

4. Simultaneous Distillation Extraction (SDE) and GC Analysis for Volatile Sulfur and Nitrogen Compounds in Peanut Butter, Peanut Oil and Peanut Flour A. References The following publications are herein incorporated by reference: T. H. Schultz et al., Isolation of Volatile Compounds, J. AGRIC. FOOD CHEM., 25:3, 446–9 (1977); S. T. Likens et al., PROC. AM. SOC. BREW. CHEM., 5 (1964).

B. Scope

This procedure applies to the analysis of steam distillable volatile components from peanut spreads, peanut paste, peanut oil and peanut flour.

C. Principle

As the sample is steam distilled at atmospheric pressure, the steam distillate and methylene chloride vapors are co-mingled then co-condensed. After liquid phase separation occurs in the extractor u-tube, the lighter aqueous phase returns to the sample flask and the heavier methylene chloride phase returns to the analyte concentration flask. When distillation/extraction is complete, the methylene chloride is gently blown down and this concentrate is analyzed further by capillary GC/NPD (Gas Chromatography/Nitrogen-Phosphorus Detector) and capillary GC/SCD (Gas Chromatography/Sulfur Chemiluminescence Detector). Two internal standards (one for nitrogen and one for sulfur analysis, as set forth below) are added to the sample at the onset of analysis to track analyte recovery. The analytical result is reported as the ratio of the analyte total peak area to the internal standard peak area.

D. Equipment

| Equipment | Specifications |
|---|---|
| Gas Chromatograph (2) | Hewlett-Packard 5890 GC equipped with SCD; Hewlett-Packard 6890 GC equipped with NPD; Hewlett-Packard Chemstation and Turbochrom Software, version 4.1 (Perkin Elmer) |
| Sulfur Chemiluminescence Detector (SCD) | Sievers 350 with 355 upgrade |
| Nitrogen-Phosphorus Detector (NPD) | Available with Hewlett-Packard 6890 GC |
| Autosample (optional) | Hewlett Packard 7673A |
| Capillary Column | For Sulfur analysis: Stabilwax 30 m × 0.32 mm ID, 0.25 um df (Restek); For Nitrogen analysis: DB Wax 30 m × 0.32 mm ID, 0.25 um df (J&W) |
| Autosampler Vials (with inserts) | Kimble EKOMCAL 60745-1232 (Kimble 60820-1232 with 66009-996 inserts) |
| Balance | Top loading, four decimal place |
| Support Jacks (2) | VWR 60142-546 |
| Hot plate/stirrer (3) | Coming 6795-220 |
| Circulating Bath/cooler | Lauda RM3 |
| 250 ml Flat Bottom Round Flask | Pyrex 4100-250 |
| 2000 ml Flat Bottom Round Flask | Kontes 601000-0829 |
| Reducing Adapter 24/40-29/42 | Pyrex 8825-2924 |
| Size 24 Stopper | Kimble 41890R-2440 |
| 50 ml and 10 ml Graduated Cylinders | Pyrex 24710-102,124 |
| 1000 ml Graduated Cylinder | Kimax 34795-062 |
| 1 ml Reaction Vial | Accuforin Kimble 60700-1 |
| Scintillation Vials | VWR 66022-081 |
| Pasteur Pipets | VWR 14672-200 |
| Syringe (2) | Hamilton 100 ul |
| Volumetric Flask | Kimax 28014-100 |
| SDE Glassware | Kontes 523010-0000, 52301, 523012 |
| Boiling Stones | VWR 26397-409 |
| Stir Bar 76.2 × 12.7 mm | VWR 58948-193 |
| Support Base | VWR 60110-266 |
| 3 Prong Clamp | VWR 21570-404 |

-continued

| Equipment | Specifications |
|---|---|
| Metal Pan (2) | Any vessel large enough/suitable for use as a water bath |

*Equivalent equipment may be substituted for that recommended above

E. Reagents

| Reagents | Specifications |
|---|---|
| Tetramethylpyrazine (TMP) | Aldrich 18,393-8 |
| Ethyl 2-hydroxyethyl sulfide | Aldrich E3,075-1 |
| Methylene Chloride | B&J 300-4 |
| Acetone | B&J 010-4 |
| Antifreeze | Commercially available, such as for automobile use |
| Deionized vater | Such as that produced using a Milli-Q system |
| Dry Ice Pellets | |
| $N_2$ | Ultra-pure compressed gas |

F. Internal Standards Preparation

Tetramethylpyrazine (TMP) for volatile nitrogen compound analysis:

Weigh 0.10 g (±0.001 g) TMP into a 100 ml volumetric flask. Add fresh deionized distilled water to volume. Label flask (0.1% N-ISTD). Add 50 ul of this standard to the 2000 ml sample flask when performing extraction.

Ethyl 2-hydroxyethyl sulfide for volatile sulfur compound analysis:

Weigh 0.10 g (±0.001 g) Ethyl 2-hydroxyethyl sulfide into a 100 ml volumetric flask. Add methylene chloride to volume. Label flask (0.1% S-ISTD). Dilute 10 times by adding 1 ml of 0.1% stock solution to a 10 ml volumetric flask and adding methylene chloride to volume. Label flask (0.01% S-ISTD). Add 50 ul of this standard to the 2000 ml sample flask when performing extraction.

G. Distillation and Extraction Procedure

Circulation bath/cooler a. Place coolant (1:1 antifreeze:$H_2O$) in cooler chamber. Fill to above cooling coil.
b. Set cooling dial to 0° C.

Distillation and Extraction a. Place SDE condenser insert into main chamber making sure inlet glass tube is to the right. Shut stopcock at the bottom of apparatus.
b. Place SDE apparatus into three prong clamp. Connect tubing to that cooler. Turn on cooler.
c. Place dry ice and approximately one inch of acetone into top condenser piece. Place top condenser piece onto assembly (dry ice may have to be added throughout extraction).
d. Place 100 ml Methylene Chloride (measured from a 100 ml graduated cylinder) and one boiling stone into the 250 ml flat bottom round flask. Join flask to right side of condenser. Place metal pan on hot plate on support jack. Add approximately 1 liter distilled $H_2O$ to metal pan and adjust support jack upwards until flask is secure to apparatus. Turn hot plate to heat setting "4" (60° C.).
e. Place stir bar and 700 ml of fresh, deionized distilled water into the 2000 ml flask. Add sample to be extracted according to the the following table:

| Sample type | Weight |
|---|---|
| Peanut Oil | 17.0 ± 0.1 g |
| Peanut spread, Peanut paste or Peanut flour | 30.0 ± 0.1 g (also add 216 ± 0.1 g powdered Na to peanut flour sample) |

Add 50 ul of 0.1% N-ISTD and 50 ul of 0.01% S-ISTD solutions to the sample flask.

f. When enough $MeCl_2$ has boiled to fill loop of condenser, attach the large flask to left side of condenser using the 24/40–29/42 reducer. Raise 2nd hot plate on jack until flask is secure. Turn hot plate heat setting to above "6" (a setting adequate to generate rapid boiling without foaming) then turn the stir setting to full.
g. Place insulating sleeve on left arm of condenser and paper towel around stopcock (if needed to catch condensation).
h. Allow sample flask to come to a boil; this will take approximately 20 minutes. When the sample comes to a boil, start timing the extraction/distillation for 90 minutes.
i. After 90 minutes turn off the heat on both hot plates. Lower right hot plate with water pan, rest bottom of flask on edge of pan. Allow condensation to stop and $MeCl_2$ flask to cool (approximately 15 minutes).
j. When $MeCl_2$ has cooled, remove the 250 ml flask from right side and add the $MeCl_2$ still in the loop of condenser to the flask via the stopcock. Place glass stopper in 250 ml flask and store in explosion-proof freezer until ready to concentrate.
k. Using hot mitts (caution, sample flask will still be hot) to lower and remove 2000 ml flask.
l. Turn off cooler. Disconnect top (inlet) hose and allow as much coolant to drain back into cooling chamber as possible. Carefully disconnect bottom (outlet) hose. Drain any remaining coolant into cooling chamber.
m. Set condenser pieces aside to wash.

Sample Extract Concentration

The extract may be stored either before step "a" or after step "d" below in an explosion-proof freezer. If storing extract after step "h", $MeCl_2$ may evaporate and the volume may need to be adjusted before further analysis.

a. Set up the third hot plate with the second metal pan containing distilled $H_2O$ in a fume hood equipped with a $N_2$ line.
b. Heat water in pan on setting "3" (60° C.).
c. Place 250 ml sample flask (from Distillation and Extraction Step j, above) into water and concentrate $MeCl_2$ to 40 ml under a gentle stream of $N_2$.
d. Transfer 20 ml of concentrate to a 20 ml scintillation vial and place vial in hot water bath on hot plate and concentrate the $MeCl_2$ under $N_2$ until approximately 2 ml remain. Hold or clamp vial so it does not float or become contaminated by $H_2O$ during concentration.
e. Remove scintillation vial from $H_2O$ and replace with a 1 ml reaction vial. Add 1 ml of concentrate from step "d" above to reaction vial using a Pasteur pipette. Transfer $MeCl_2$ so that it does not drip from the pipette tip.

f. As MeCl$_2$ blows down, continue to add sample concentrate until all has been transferred from the scintillation vial. Rinse scintillation vial with approximately 1 ml of fresh MeCl$_2$ and transfer this rinse to a reaction vial.

g. Continue to concentrate MeCl$_2$ until 100 ul remains. Do not allow the extract to evaporate to dryness. Transfer the 100 ul via a syringe to a 250 ul autosampler GC vial. Cap GC Vial and follow the instructions for GC/NPD and GC/SCD analysis.

H. GC/SCD Analysis for Volatile Sulfur Components

1. Install the fused silica capillary column (Restek, Stabilwax 30 m×0.32 mm ID, 0.25 u film thickness) in the HP 5890 GC with SCD (Sievers, Sulfur Chemiluminescence Detector).
2. Set the column head pressure to 9 psi to maintain 2 ml/min He carrier gas flow at room temperature.
3. The GC oven temperature program is initial isotherm of 32° C. for 10 minutes, temperature program of 3° C./min to 90° C. with no hold time, second temperature program of 8° C./min to 230° C., then a 10 minute hold.
4. SCD (Sievers 350 with 355 upgrade) operation conditions are the following:

| | | |
|---|---|---|
| Pressure (Torr) | Controller: 212 | SCD: 10 |
| Burner Temperature (° C.) | 801 | |
| Hydrogen flow | 100 ml/min. | |
| Air flow | 40 ml/min. | |
| Air pressure for ozone | 7 psi | |

5. 1 ul of the SDE extract is injected using split injection technique. The split vent flow is adjusted to 20 ml/min.
6. The signal from the SCD is sent to the Turbochrom workstation (Perkin Elmer) for peak integration. The integration parameters are:

| | |
|---|---|
| Bunch factor | 1 points |
| Noise threshold | 12 uv |
| Area threshold | 61 uv |
| Peak width ratio | 0.2 |
| Valley to peak ratio | 0.01 |
| Peak height ratio | 5 |
| Adjusted height ratio | 4 |
| Valley height ratio | 3 |

7. The results are automatically reported as the ratio of the total sample sulfur peak area to internal standard peak area.

I. GC/NPD Analysis for Volatile Nitrogen Components

1. Install the fused silica capillary column (J&W, DB Wax 30 m×0.32 mm ID, 0.25 u film thickness) in the HP 6890 GC with NPD (Nitrogen Phosphorus Detector).
2. A constant He carrier gas flow of 2 ml/min is maintained using Electronic Pressure Control (EPC).
3. The same GC oven temperature program is used as described for GC/SCD analysis.
4. NPD operation conditions are the following:

| | |
|---|---|
| Detector temperature | 300° C. |
| Hydrogen flow | 3 ml/min. |

-continued

| | |
|---|---|
| Air flow | 60 ml/min |
| Nitrogen make up gas flow | 30 ml/min. |
| Bead voltage | 3.406 V |
| Off-set | 30 |

5. 1 ul of the SDE extract is injected using splitless injection technique. The split vent is opened 0.5 minutes after injection. The split vent flow is adjusted to 80 ml/min.
6. The signal from the NPD is sent to HP Chemstation for peak integration. The integration parameters are:

| | |
|---|---|
| Initial sensitivity | 25 |
| Initial peak width | 0.04 |
| Initial area rejection | 50 |
| Initial height rejection | 2 |
| Initial shoulder | drop |
| 0 minutes integration | off |
| 8 minutes integration | on |

7. The results are automatically reported as the ratio of the total sample nitrogen peak area to internal standard peak area.

EXAMPLES

The following are representative examples of peanut spreads prepared according to the present invention.

Example 1

Preparation of a Roll-milled Mix from Darker Roasted Peanuts and Methods for Reducing Over-Roasted Flavor Peanuts are roasted in a Jet Zone™ roaster at 400° F. to a 25 L' color. The roasted nuts are then blanched. The clean nuts are then ground to a paste by processing them through a Bauer mill. The peanut paste has an intense peanut flavor but also has a very strong burnt/bitter taste at this point.

To reduce the over-roasted taste, the peanuts are defatted to about 28% fat. Preferably, a mechanical press similar in principle to a cocoa powder press, used in the chocolate industry to make cocoa powder, is used. After defatting, the peanut cake is then delumped and milled to a flour-like consistency.

Defatting removes a significant portion of the undesirable burnt/bitter components. As shown in FIGS. 7a and 7b, defatting decreases the amount of total volatile sulfur and total volatile nitrogen compounds. Before defatting, the peanut paste's total volatile sulfur compounds ratio is about 1665 and the total volatile nitrogen compounds ratio is about 34. After defatting, the resulting peanut flour's total volatile sulfur compounds ratio is about 1189 and the total volatile nitrogen compounds ratio is about 7.

Further reduction in the over-roasted taste is achieved by altering the flavor display of the defatted peanut flour. This is achieved by roll-refining the peanut flour with sucrose. The roll-milled mix is made by mixing defatted peanut flour (about 28% fat) with 12X sucrose in a 100 lb Hobart mixing bowl. A model V1401 H Hobart mixer is used. The mix is composed of 76% defatted nut solids and 24% sucrose. Uniform mixing of the defatted peanut flour and sucrose is achieved by setting the mix speed at the #2 setting and allowing 5 minutes of mix time. After mixing, the mix is fed into a 4-roll mill manufactured by Lehman Mschinefabrik GMBH of Aalen/Wurtt, Germany. The mix is "choke" fed into the mill, i.e., the product is constantly fed into the roll-mill so that there is always a supply of product in the trough formed by the intakes of the first nip. The mills are operated at zero gap between three rolls. The rolls are pressed together by a hydraulic system and are moved apart by the product. The pressure to the rolls is set to produce a mono-modal PSD. In the embodiment disclosed herein, a suitable pressure is from about 250 to about 400 psi.

Milling the product through the roll-refiner reduces the particle size of the mix. Specifically, this reduces the nut solids to a mono-modal particle size distribution. The sugar particles are also reduced in size. The particle size of the mix is reduced to a $D_{50}$ and a $D_{90}$ of 9.3 and 26.7 microns, respectively. The roll-milled mix has a particle size distribution that is dispersed in a bi-modal distribution of the type shown in FIG. 3a. The nut solids are distributed in a mono-modal particle size distribution of the type shown in FIG. 3b and have a $D_{50}$ and a $D_{90}$ of 10.7 and 24 microns, respectively.

Because of the intense milling conditions of the roll nips, the sugar particles become amorphous. The amorphous state of the sugar allows it to selectively bind aromas and flavors and, as a result, the flavor is altered. Specifically, the roll-milling process eliminates any trace of the undesired burnt/bitter flavors in the finished product.

Example 2
Improved Peanut Butter Prepared By Incorporating a Roll-Milled Mix with a Base Butter Peanut Butter Formulation for a 300 lb batch

| Ingredients | % by weight | Amount for 300 lb batch (lbs) |
|---|---|---|
| Lighter Roasted Peanuts (36 L'color) | 71.60 | 214.80 |
| Sugar | 3.68 | 11.04 |
| Peanut Oil | 10.27 | 30.81 |
| Salt | 1.00 | 3.00 |
| Molasses | 0.50 | 1.50 |
| Stabilizer | 2.10 | 6.30 |
| Roll-milled Mix as prepared in Example 1 | 10.85 | 32.55 | a. Preparation of the base butter

The base butter is prepared by roasting peanuts at 400° F. for about 4 minutes in a Jet Zone™ roaster to a 36 L' roast color. The roasted nuts are then blanched. The clean nuts are ground to a paste by processing through a Bauer mill. Next, the paste is deposited into a 100 gallon Hamilton kettle heated to 150° F. Sugar, peanut oil, salt, molasses and fat stabilizer are then added and mixed with the paste for 10 minutes. The amount of each ingredient is listed in the formulation table above. After mixing the ingredients, the nut mix is processed through a model 18.72 Rannie homogenizer operated at 12,000 psi to reduce the particle size of the mix. The homogenized mix has a mono-modal particle size distribution, with a $D_{50}$ and a $D_{90}$ that are 7.7 microns and 19.7 microns, respectively. After homogenization, the mix is deposited into another mix tank heated to 150° F.

b. Combining the base butter with the roll-milled mix

The roll-milled mix is then added to the homogenized base butter and mixed for 5 minutes. The roll-milled mix makes up about 10.85%, by weight, of the final product formulation. To reduce viscosity, the mix is processed through a colloid mill(s) until its apparent viscosity is about 1000 cP or less (measured at 6.8 sec$^{-1}$).

The low viscosity butter is then processed through a conventional peanut butter finishing process in order to increase its oxidative stability and to set up its crystalline structure. To increase its oxidative stability the butter is processed through a Versator at 21 inches of water vacuum. Nucleation of the fat crystals is achieved by cooling the butter to about 90° F. by passing it through a scrape wall heat exchanger. Cooling fluid, typically brine at −10° F., is circulated through the outside of the heat exchanger. Fat crystalline growth is promoted by passing the nucleated butter through pickers. The nucleated butter is then deposited into jars and is nitrogen blanketed. The jars are then placed in a 90° F. room for 24 hours, and then at 70° F. for another 24 hours, in order to finish the tempering process.

Example 3
Improved Peanut Butter Prepared By Incorporating a Paste Mixture of a Roll-Milled Mix with a Base Butter Peanut Butter Formulation for a 300 lb batch

| Ingredients | % by weight | Amount in a 300 lb batch (lbs) |
|---|---|---|
| Lighter Roasted Peanuts (36 L' color | 71.60 | 214.80 |
| Sugar | 3.68 | 11.04 |
| Added Peanut Oil | 6.39 | 19.17 |
| salt | 1.00 | 3.00 |
| Molasses | 0.50 | 1.50 |
| Stabilizer | 2.10 | 6.3 |
| Roll-milled Paste Mix comprised of 73.66% roll-milled mix (As prepared in Example 1) and 26.34% peanut oil | 14.73 | 44.19 |

The peanut butter of this development is made by combining a base butter with a fluid peanut paste prepared from a mixture of peanut oil and the roll-milled mixture of defatted peanut flour and sugar. The steps are as follow:

a. Refatting the roll-milled mix to a paste mixture

The roll-milled mix, as prepared in Example 1, is combined with peanut oil to make a fluid paste mixture. The mixture consists of about 73.66% roll-milled mix and about 26.34% peanut oil. The mixture can be made in a suitable sized mixing bowl, such as a Hobart mixer, or made continuously by co-mixing the roll-milled solids with peanut oil in a twin screw Readco mixer. The paste mixture has a fat content of about 42% and is fluid.

b. Preparation of the base butter

The base butter is prepared as in Example 2, above.

c. Combining the base butter with the paste mixture

The paste mixture is added to the homogenized base butter and mixed for 5 minutes. The paste mixture makes up about 14.73% of the final product formulation. To reduce viscosity, the mix is processed through a colloid mill(s) until its apparent viscosity is about 1000 cP or less (measured at 6.8 sec$^{-1}$).

The low viscosity butter is then processed through a conventional peanut butter finishing process, as in Example 2, in order to increase its oxidative stability and to set up its crystalline structure.

Example 4
Improved Peanut Butter Prepared by Incorporating Defatted Peanut Flour with a Base Butter Peanut Butter Formulation For a 300 lb Batch

| Ingredients | % by weight | Amount for a 300 lb batch (lbs) |
|---|---|---|
| Lighter Roasted Peanuts (36 L' color) | 71.60 | 214.80 |
| Sugar | 6.28 | 18.84 |
| Peanut oil | 10.27 | 30.81 |
| Salt | 1.00 | 3.00 |
| Molasses | 0.50 | 1.50 |
| Stabilizer | 2.10 | 6.30 |
| Defatted Peanut Flour (28% fat) from peanuts roasted to a 25 L' color | 8.25 | 24.75 |

The peanut butter of this development is made by combining a base butter with a defatted peanut flour. The formulation for the product is given above.

a. Preparation of the base butter

The base butter is prepared in the manner of Example 2, substituting the ingredients in the table above.

b. Combining the base butter with the defatted peanut flour

Peanuts roasted to a 25 L' roast color are converted to a paste, then mechanically defatted to about a 28% fat level. The resultant cake is then milled into a flour and added to the homogenized base butter and mixed for 5 minutes with the added peanut oil. The defatted peanut flour makes up about 8.25% of the final product formulation. By not roll-refining the defatted peanut flour to a mono-modal particle size distribution, significantly more processing effort is needed to achieve a finished product with an apparent viscosity that is less than about 1000 cP. To achieve this viscosity, the mixture of base butter, defatted peanut flour and added peanut oil are re-circulated through a Gaulin homogenizer at 6000 psi and a colloid mill until the entire batch undergoes about two re-circulation passes. At the end of the process, the product has a mono-modal particle size distribution and an apparent viscosity that is less than about 1000 cP (measured at 6.8 sec$^{-1}$).

The low viscosity butter is then processed through a conventional peanut butter finishing process, as in Example 2, in order to increase its oxidative stability and to set up its crystalline structure.

The finished product made with the defatted peanut flour has more peanut flavor than conventional peanut butters. Since the defatted peanut flour is not roll-milled with sucrose, the burnt/bitter flavor is slight, but noticeable.

Example 5
An Improved Reduced Fat Peanut Spread with More Peanut Flavor Prepared by Incorporating a Roll-milled Mix with a Base Butter Reduced Fat Peanut Spread Formulation For a 300 lb Batch

| Ingredients | % by weight | Amount in a 300 lb batch (lbs) |
|---|---|---|
| Lighter Roasted Peanuts (35 L' color Peanuts | 49.60 | 148.8 |
| Sugar | 4.00 | 12.0 |
| Peanut Oil | 3.80 | 11.4 |
| Salt | 1.60 | 4.80 |
| Molasses | 0.50 | 1.50 |
| Stabilizer | 1.25 | 3.75 |
| Emulsifier | 0.70 | 2.10 |
| Roll-milled Mix as prepared in Example 1 | 10.00 | 30.0 |
| Corn syrup solids | 23.40 | 70.20 |
| Soy protein isolate | 5.00 | 15.00 |
| Vitamins | 0.15 | 0.45 |

An improved reduced fat peanut butter with more peanut flavor is made by adding roll-milled peanut solids to its formulation. The ingredients and levels used to make the improved reduced fat peanut butter are disclosed below.

a. Preparation of the base butter

The base butter is prepared in the manner of Example 2, substituting the ingredients in the table above.

b. Combining the base butter with the roll-milled mix

The roll-milled mix is added to the homogenized base butter. The roll-milled mix makes up about 10% of the final product formulation. The corn syrup solids and soy protein isolate are then gradually added into the mixture while the mixture is re-circulated through a Gaulin homogenizer at 6000 psi and a colloid mill. At the end of the solids addition (about 45–60 minutes for a 300 lb batch size) the mixture is re-circulated for another 30 minutes in order to reduce the apparent viscosity to about 850 cP or less (measured at 6.8 sec$^{-1}$). After the viscosity is lowered, the vitamins are added to the mix.

The low viscosity nut spread is then processed through a conventional peanut butter finishing process in order to increase its oxidative stability and to set up its crystalline structure, as in Example 2.

What is claimed is:

1. A method of preparing a nut spread composition, the method comprising the steps of:
   a. providing a lighter roasted nut composition;
   b. providing a darker roasted nut composition, wherein said darker roasted nut composition comprises defatted nut flour; and
   c. combining said lighter roasted nut composition with said darker roasted nut composition to provide said nut spread composition.

2. The method of claim 1, wherein said darker roasted nut composition comprises roasted nuts that are at least 5 L' color units darker than the roasted nuts comprising said lighter roasted nut composition.

3. The method of claim 2, wherein said darker roasted nut composition comprises roasted nuts that are at least 10 L' color units darker than the roasted nuts comprising said lighter roasted nut composition.

4. The method of claim 3, wherein said lighter roasted nut composition comprises a base butter.

5. The method of claim 3, wherein said defatted nut flour has a total volatile sulfur compounds ratio of less than about 1500 and a total volatile nitrogen compounds ratio of less than about 10.

6. A nut spread composition made according to the method of claim 5.

7. The method of claim 1, wherein said darker roasted nut composition comprises roasted nuts having a roast color of less than about 32 L' color units.

8. The method of claim 7, wherein said darker roasted nut composition comprises roasted nuts having a roast color of from about 24 L' to about 30 L' color units.

9. The method of claim 8, wherein said lighter roasted nut composition comprises roasted nuts having a roast color of less than about 39 L' color units.

10. The method of claim 9, wherein said lighter roasted nut composition comprises roasted nuts having a roast color of from about 35 L' to about 38 L' color units.

11. The method of claim 10, wherein said defatted nut flour has a total volatile sulfur compounds ratio of less than about 1500 and a total volatile nitrogen compounds ratio of less than about 10.

12. A nut spread composition made according to the method of claim 11.

13. The method of claim 1, wherein said defatted nut flour comprises from about 10% to about 42% fat, by weight.

14. The method of claim 13, wherein said defatted nut flour comprises from about 10% to about 33% fat, by weight.

15. The method of claim 14, wherein said defatted nut flour comprises from about 20% to about 30% fat, by weight.

16. The method of claim 1, wherein said darker roasted nut composition comprises a roll-milled mix.

17. The method of claim 16, wherein said roll-milled mix comprises amorphous sugar.

18. A nut spread composition made according to the method of claim 17.

19. The nut spread composition of claim 18, wherein said nut spread composition has an apparent viscosity of less than about 1000 cP.

20. The method of claim 1, wherein said defatted nut flour comprises from about 5% to about 25%, by weight, of the nut spread composition.

21. The method of claim 20, wherein said defatted nut flour comprises from about 6% to about 20%, by weight, of the nut spread composition.

22. The method of claim 21, wherein said defatted nut flour comprises from about 8% to about 15%, by weight, of the nut spread composition.

23. A nut spread composition made according to the method of claim 22.

24. The nut spread composition of claim 23, wherein said nut spread composition has an apparent viscosity of less than about 1000 cP.

25. The method of claim 1, wherein said defatted nut flour has a total volatile sulfur compounds ratio of less than about 1500 and a total volatile nitrogen compounds ratio of less than about 10.

26. A nut spread composition made according to the method of claim 25.

27. A method of preparing a nut spread composition, the method comprising the steps of:
   a. roasting nuts to from about 35 L' to about 38 L' color units to provide lighter roasted nuts;
   b. forming a mono-modal base butter comprising said lighter roasted nuts;
   c. roasting nuts to at least about 10 L' color units darker than said lighter roasted nuts to provide darker roasted nuts;
   d. defatting said darker roasted nuts to form defatted nut solids;
   e. preparing defatted nut flour from said defatted nut solids;
   f. roll-milling said defatted nut flour with sugar to form a roll-milled mix comprising amorphous sugar;
   g. preparing a paste mix by mixing oil into the roll-milled mix;
   h. providing added oil;
   i. combining said mono-modal base butter and said paste mix with said added oil to form a mixture; and
   j. processing said mixture to provide a nut spread composition having an apparent viscosity of less than about 1000 cP.

28. A nut spread composition made according to the method of claim 1.

29. The nut spread composition of claim 28, wherein said nut spread composition has an apparent viscosity of less than about 1000 cP.

30. A nut spread composition made according to the method of claim 27.

31. The method of claim 27, wherein said defatted nut flour has a total volatile sulfur compounds ratio of less than about 1500 and a total volatile nitrogen compounds ratio of less than about 10.

32. A nut spread composition made according to the method of claim 31.

33. A defatted peanut flour having a total volatile sulfur compounds ratio of less than about 1500 and a total volatile nitrogen compounds ratio of less than about 10.

34. A roll-milled mix comprising the defatted peanut flour of claim 33 and amorphous sugar.

35. A paste mix comprising the roll-milled mix of claim 34 and added oil.

* * * * *